(12) United States Patent
Knepler

(10) Patent No.: US 9,265,375 B2
(45) Date of Patent: Feb. 23, 2016

(54) BREWER SYSTEM INCLUDING PERVASIVE RFID SENSING FOR SERVERS

(75) Inventor: John T. Knepler, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 893 days.

(21) Appl. No.: 12/920,581

(22) PCT Filed: Mar. 6, 2009

(86) PCT No.: PCT/US2009/036397
§ 371 (c)(1),
(2), (4) Date: Oct. 25, 2010

(87) PCT Pub. No.: WO2009/111742
PCT Pub. Date: Sep. 11, 2009

(65) Prior Publication Data
US 2011/0052766 A1     Mar. 3, 2011

Related U.S. Application Data

(60) Provisional application No. 61/034,333, filed on Mar. 6, 2008.

(51) Int. Cl.
*A47J 31/40*     (2006.01)
*A47J 31/06*     (2006.01)
(Continued)

(52) U.S. Cl.
CPC ............... *A47J 31/057* (2013.01); *A47J 31/52* (2013.01)

(58) Field of Classification Search
CPC ................................ A47J 31/52; A47J 31/057
USPC ............. 99/280–283, 285; 426/231; 700/231, 700/233, 236, 240
See application file for complete search history.

(56) References Cited

U.S. PATENT DOCUMENTS 4,602,145 A    7/1986   Roberts
4,858,523 A    8/1989   Helbling
(Continued)

FOREIGN PATENT DOCUMENTS

CA     2555329     1/2005
DE     4103820 A1    10/1991
(Continued)

OTHER PUBLICATIONS

Supplementary Search Report issued in European Patent Application No. 09717228 (2011).
(Continued)

*Primary Examiner* — Dana Ross
*Assistant Examiner* — Lindsey C Teaters
(74) *Attorney, Agent, or Firm* — Barnes & Thornburg LLP

(57) ABSTRACT

An apparatus, system, and method for use with beverages and beverage making and dispensing equipment. The apparatus, system, and method of use monitors characteristics of the beverage, reports characteristics, or both and selectively affects the beverage and beverage making and dispensing equipment, a server containing the beverage, or both. The apparatus, system, and method of use employs an information vehicle device associated with each beverage server or dispenser and a reader which reads the information device. The reader communicates the information from the information device to a controller for use to individually or collectively display information, collect information, and/or selectively affect the condition of the beverage in response to the information.

18 Claims, 19 Drawing Sheets

(51) Int. Cl.
*G01N 33/02* (2006.01)
*A01K 43/00* (2006.01)
*G06F 17/00* (2006.01)
*A47J 31/057* (2006.01)
*A47J 31/52* (2006.01)

(56) References Cited

U.S. PATENT DOCUMENTS

| | | | |
|---|---|---|---|
| 4,917,005 A | 4/1990 | Knepler | |
| 4,967,648 A | 11/1990 | Helbling | |
| 5,072,660 A | 12/1991 | Helbling | |
| 5,080,008 A | 1/1992 | Helbling | |
| 5,094,153 A | 3/1992 | Helbling | |
| 5,158,793 A | 10/1992 | Helbling | |
| 6,726,947 B1 | 4/2004 | Gutwein et al. | |
| 6,931,984 B2 | 8/2005 | Lassota | |
| 6,953,919 B2 | 10/2005 | Clothier | |
| 7,197,377 B2 | 3/2007 | Knepler | |
| 7,223,427 B2 | 5/2007 | Knepler | |
| 7,637,205 B2 | 12/2009 | Greiwe et al. | |
| 2004/0261624 A1 | 12/2004 | Lassota | |
| 2005/0148828 A1 | 7/2005 | Lindsay | |
| 2005/0188856 A1 | 9/2005 | Sumser et al. | |
| 2005/0230417 A1 | 10/2005 | Knepler et al. | |
| 2005/0247206 A1 | 11/2005 | Lyall et al. | |
| 2005/0253704 A1 | 11/2005 | Neuwirth | |
| 2005/0253725 A1 | 11/2005 | Neuwirth et al. | |
| 2005/0258937 A1 | 11/2005 | Neuwirth | |
| 2005/0258956 A1 | 11/2005 | Neuwirth | |
| 2006/0000851 A1 | 1/2006 | Girard et al. | |
| 2006/0016347 A1 | 1/2006 | Girard et al. | |
| 2006/0081653 A1 | 4/2006 | Boland et al. | |
| 2006/0123994 A1* | 6/2006 | Greiwe et al. | 99/275 |
| 2006/0132311 A1 | 6/2006 | Kruest et al. | |
| 2006/0144244 A1 | 7/2006 | Girard et al. | |
| 2006/0180647 A1 | 8/2006 | Hansen | |
| 2007/0068393 A1 | 3/2007 | Nosler et al. | |
| 2007/0163446 A1 | 7/2007 | Halliday et al. | |
| 2007/0187425 A1 | 8/2007 | Knepler | |
| 2007/0203587 A1 | 8/2007 | Erlandsson et al. | |
| 2007/0214055 A1 | 9/2007 | Temko | |
| 2007/0214966 A1* | 9/2007 | Bishop | A47J 31/52 99/280 |
| 2008/0000358 A1 | 1/2008 | Goeckner et al. | |

FOREIGN PATENT DOCUMENTS

| | | |
|---|---|---|
| EP | 0972481 A1 | 1/2000 |
| EP | 1491121 | 12/2004 |
| JP | S61-106117 | 5/1986 |
| JP | H04-227213 | 8/1992 |
| JP | 2005-537195 | 12/2005 |
| JP | 2006-517334 A | 7/2006 |
| WO | WO 02/45559 | 6/2002 |

OTHER PUBLICATIONS

Search Report issued in International Application No. PCT/US2009/036397 (2009).

Office Action issued in Application No. JP 2010-549922 (Jun. 21, 2013).

Office Action issued in Application No. JP 2010-549922 (May 30, 2014).

\* cited by examiner

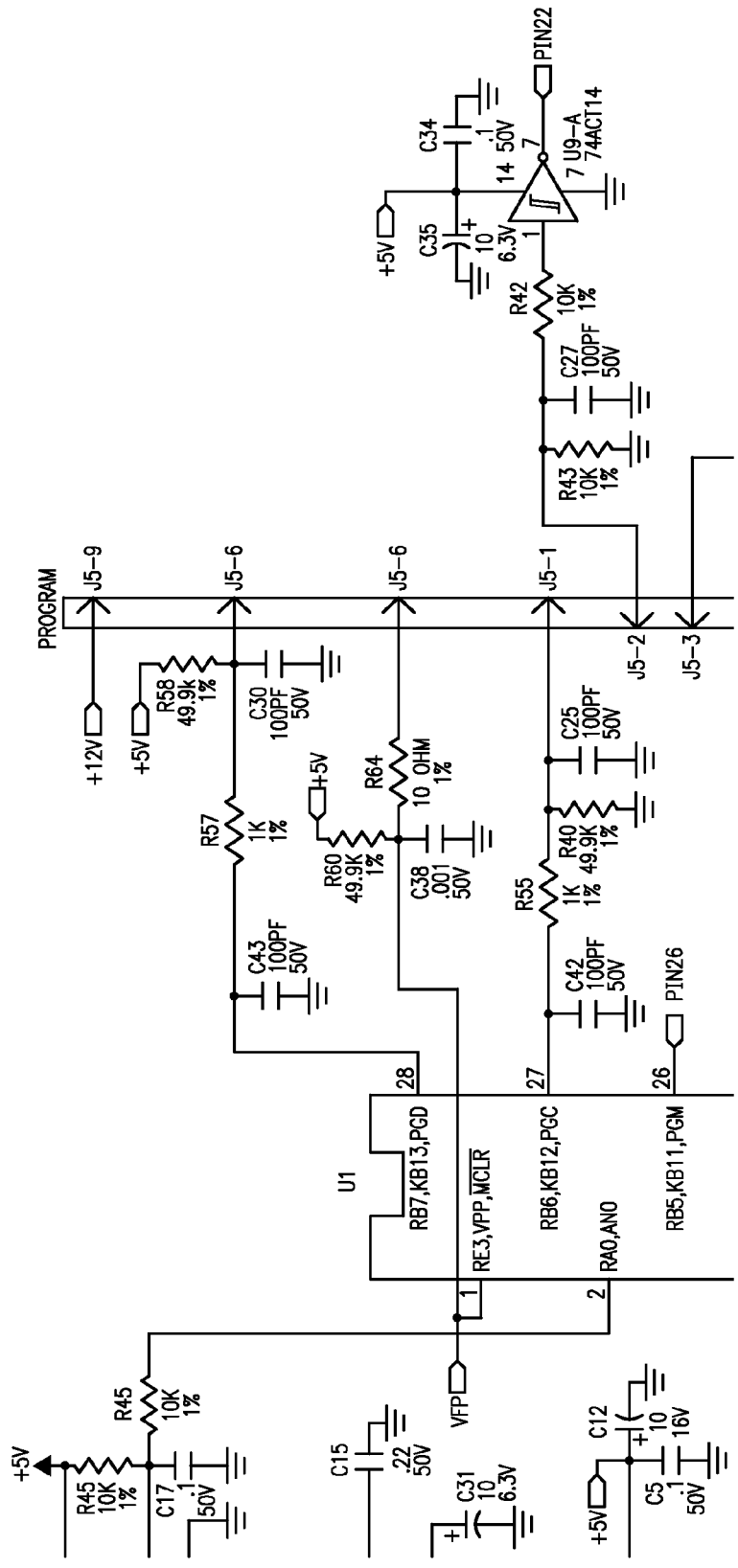

FIG. 8-3

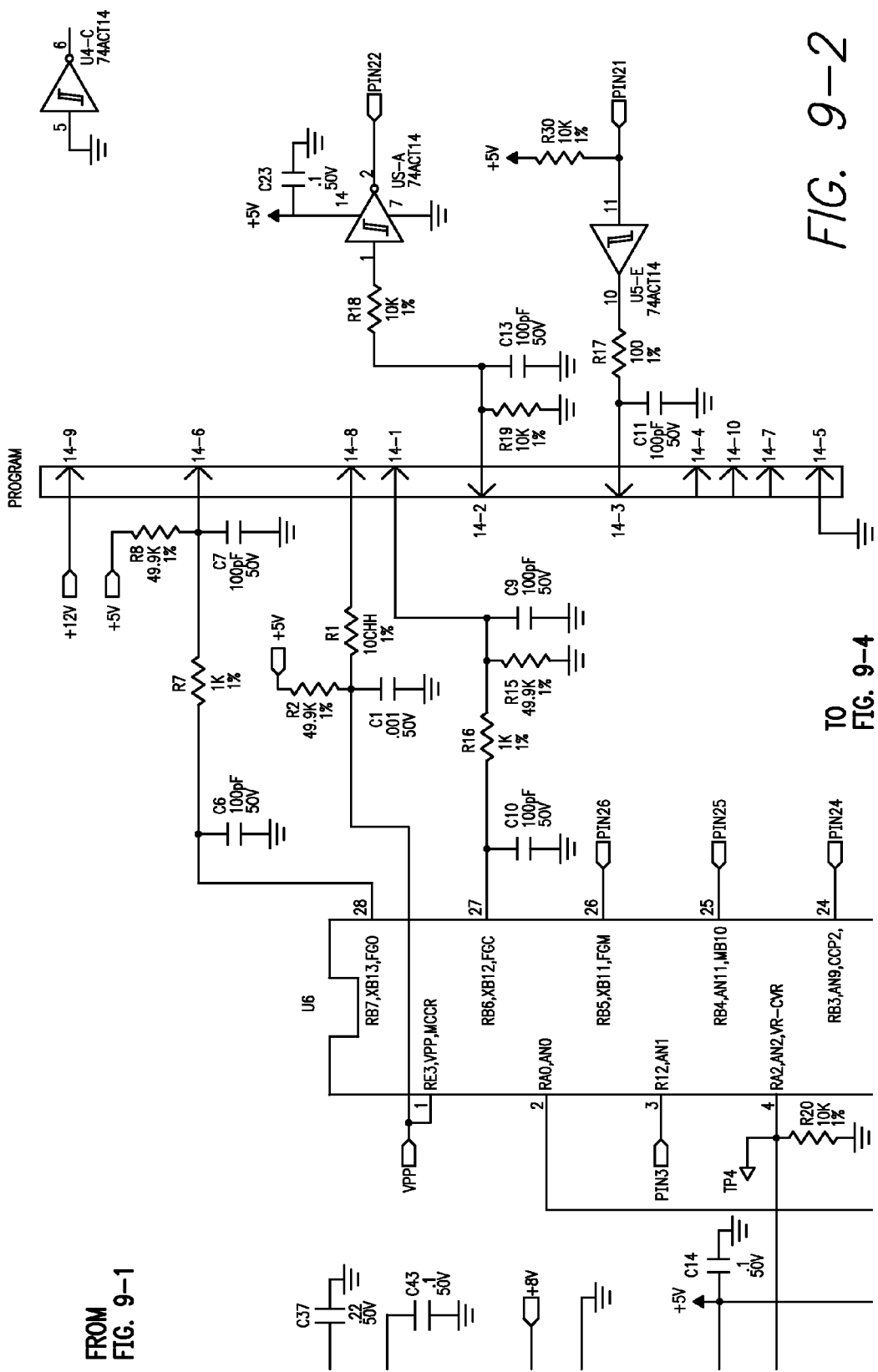

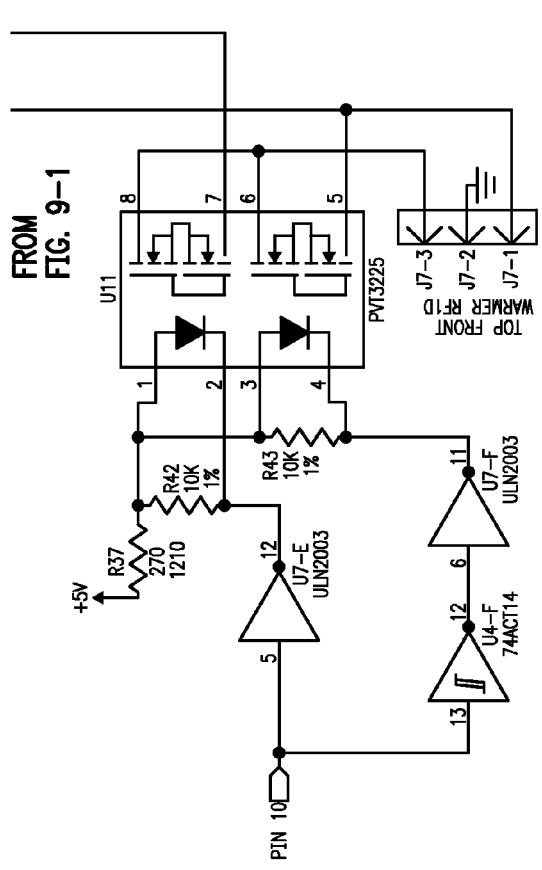

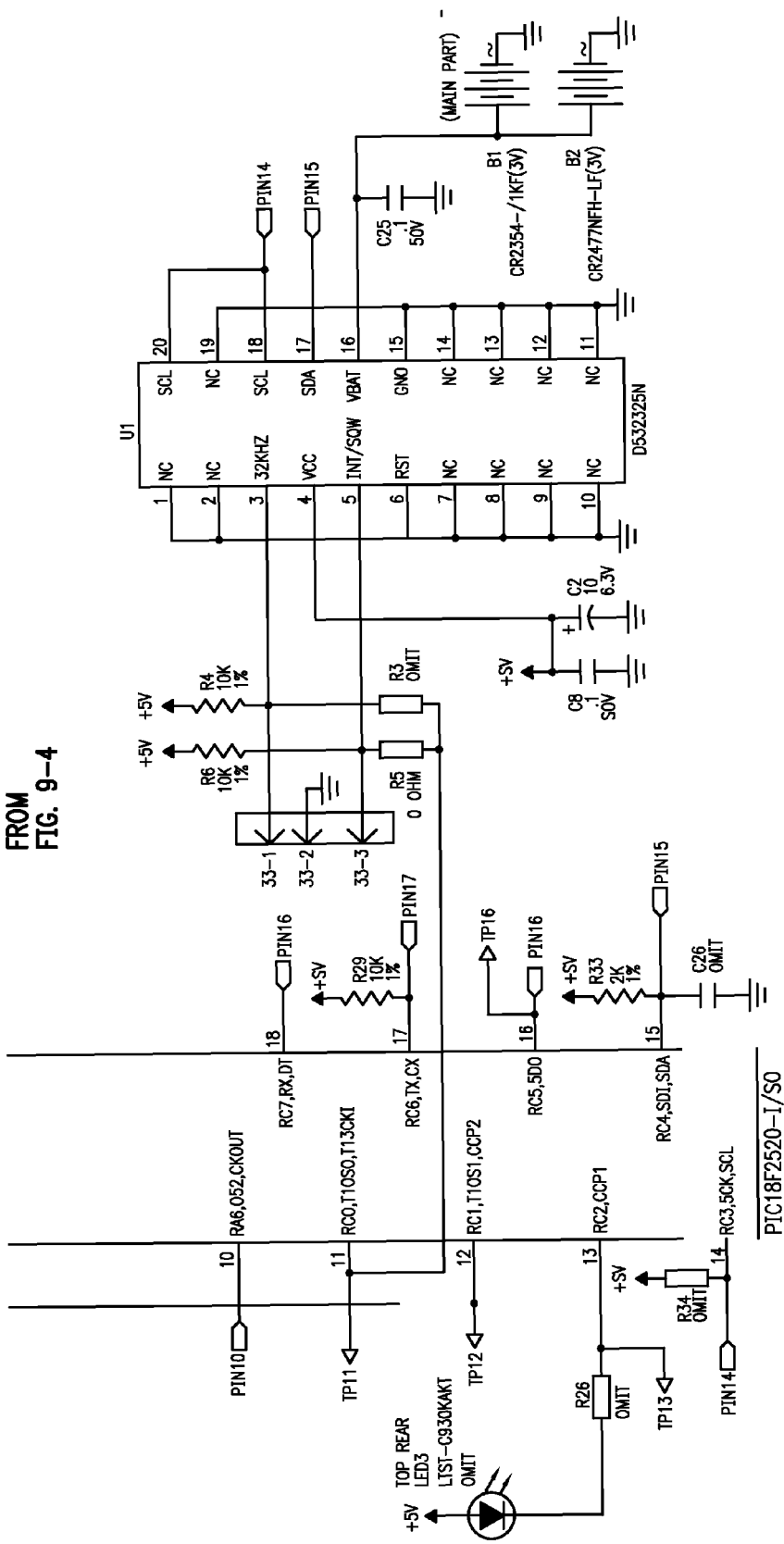
FIG. 9-6

BREWER SYSTEM INCLUDING PERVASIVE
RFID SENSING FOR SERVERS

This patent application is a U.S. nationalization under 35 U.S.C. §371 of International Application No. PCT/US2009/036397, filed Mar. 6, 2009, which claims the benefit of priority under 35 U.S.C. §119 (e) to U.S. Provisional Application Ser No. 61/034,333, filed Mar. 6, 2008. The disclosures set forth in the referenced applications are incorporated herein by reference in their entireties, including all information as originally submitted to the United States Patent and Trademark Office.

BACKGROUND

The present disclosure relates to an apparatus, system, and method for use with beverages and beverage making and dispensing equipment. The apparatus, system, and method of use monitors characteristics of the beverage, reports characteristics, or both and selectively affects the beverage and beverage making and dispensing equipment, a server containing the beverage, or both. The apparatus, system, and method of use employs an information device associated with each beverage server or dispenser and a reader which reads the information device. The reader communicates the information from the information device to a controller for use to individually or collectively display information, collect information, and/or selectively affect the condition of the beverage in response to the information.

The exemplification set out herein illustrates embodiments of the disclosure and is not to be construed as limiting the scope of the disclosure in any manner. Additional features of the present disclosure will become apparent to those skilled in the art upon consideration of the following brief description of illustrative embodiments exemplifying the best mode of carrying out the disclosure as presently perceived.

BRIEF DESCRIPTION OF THE DRAWINGS

FIGS. 8-1 through 8-6 is a schematic associated with the RFID device associated with the information device of the present disclosure;

FIGS. 9-1 through 9-6 is a schematic illustration of the controls associated with the system; and FIGS. 10-1 through 10-2 is a schematic illustration of the electrical schematic associated with the beverage system, apparatus and method of the present disclosure.

Figure 1:
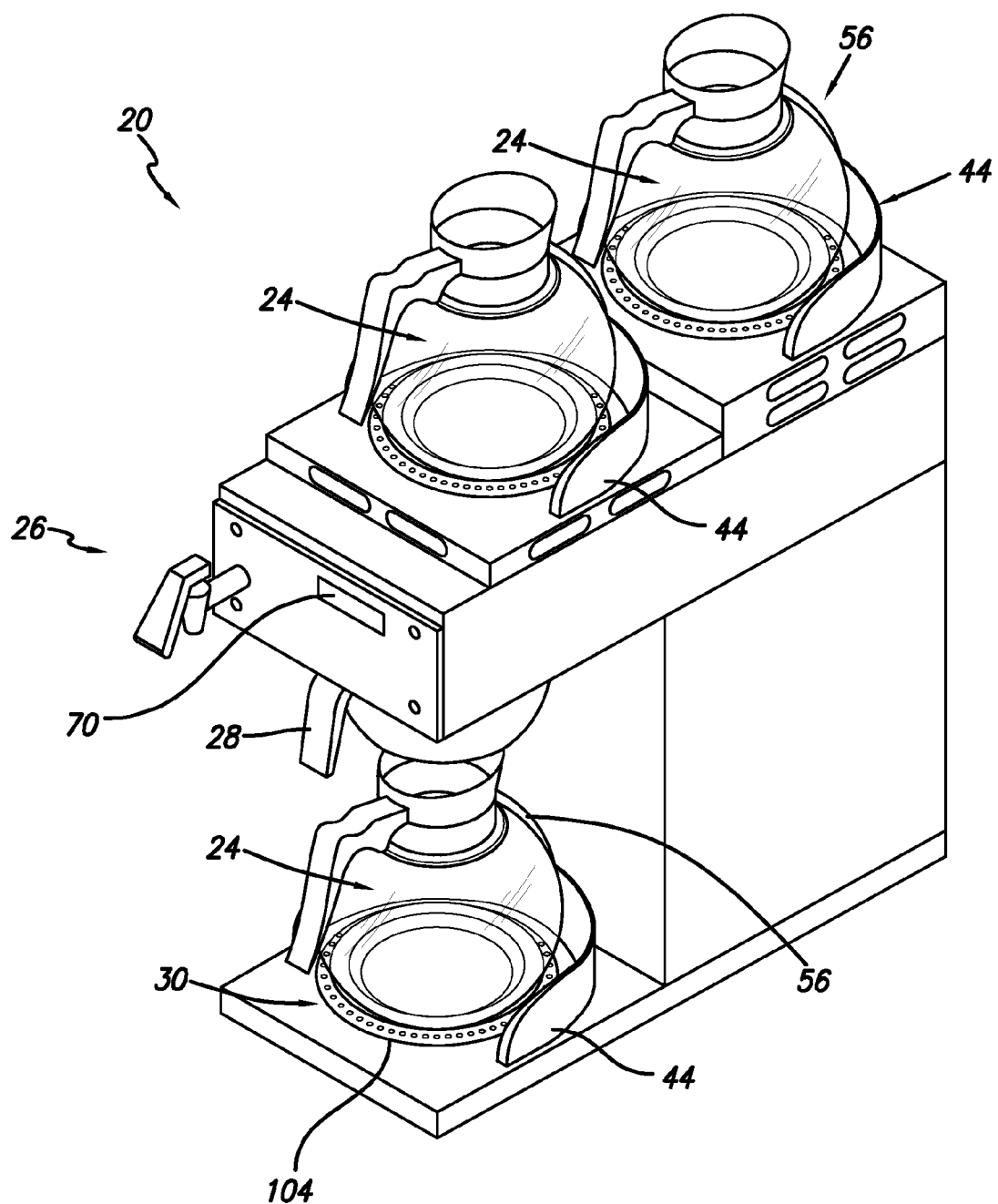
FIG. 1 is a diagrammatic illustration of a beverage system for use with the present apparatus, system, and method, illustrating a server including an information device positioned relative to a reader for obtaining information from the information device, also illustrated are multiple stations including corresponding readers, controllers, and displays.

The exemplification set out herein illustrates embodiments of the disclosure and is not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

Figure 4:
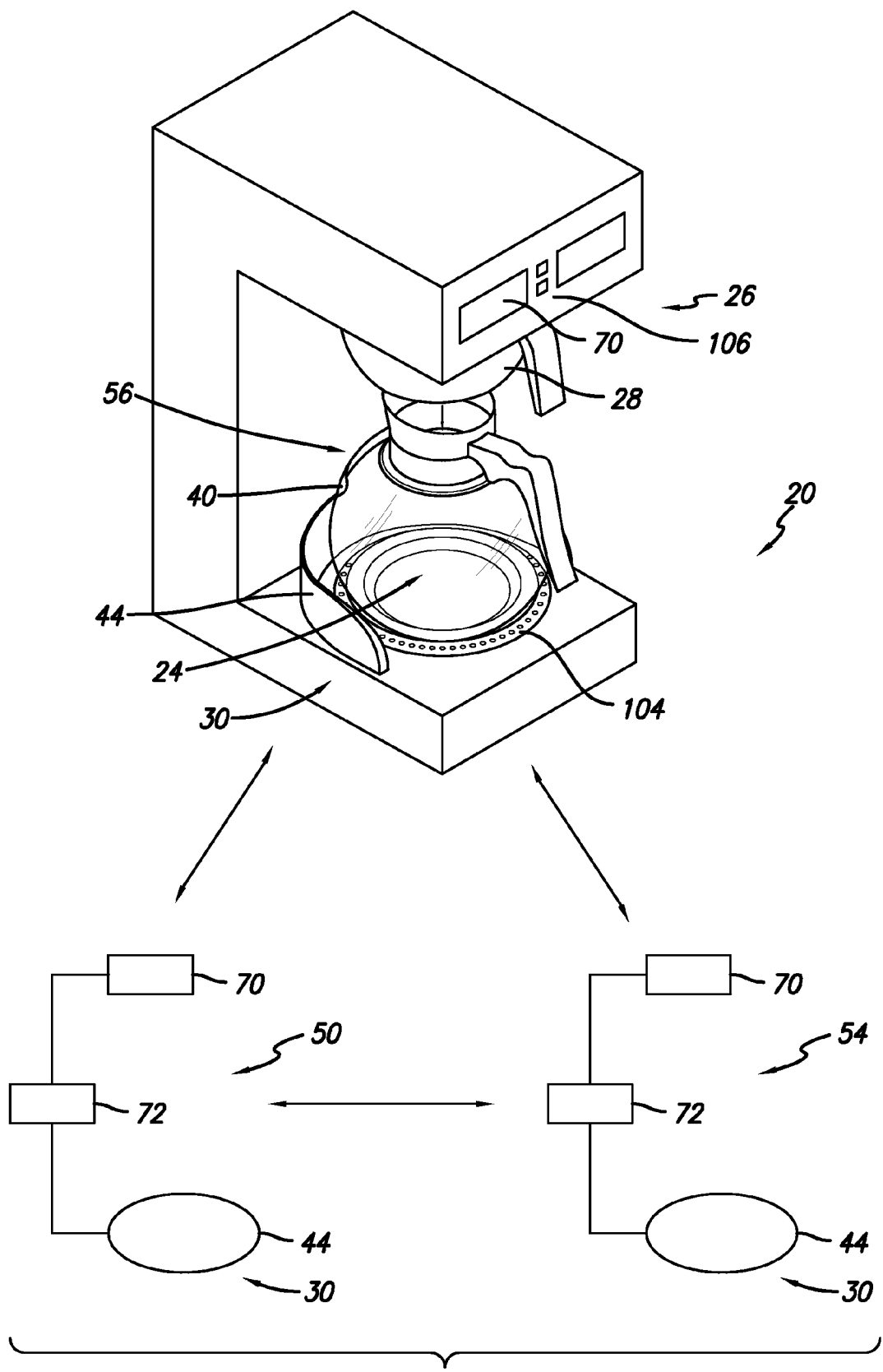
FIG. 4 is a diagrammatic illustration of a beverage system for use with the present apparatus, system, and method, illustrating a server including an information device positioned relative to a reader for obtaining information from the information device, also illustrated are multiple stations including corresponding readers, controllers, and displays.

With reference to FIGS. 1 and 4, disclosed is a beverage system 20 which includes a beverage maker 26 for making, dispensing, and collecting beverage for selective dispensing. The beverage system 20 includes sensing technology to sense the presence, absence, or both of a server 24 associated with the system and characteristics associated with beverage contained in the server 24. The server 24 may be in the form of a heatable server 24a or an unheated server 24b. The heatable server 24a might be in the form of glass server 24a for retaining coffee or other heated beverage. Alternatively, the unheated server 24b might be in the form of a thermal server which does not require any added heat to retain the heated beverage in a suitable heated condition for an acceptable period of time.

The embodiment of the system 20 shown in the FIG. 1 includes a beverage brewer 26. For example the brewer 26 is capable of brewing coffee, tea or any other beverage. The brewer 26 includes a location 30 for placing a beverage making substance holder or funnel 28, a water delivery system (not shown), a server, carafe, decanter or other corresponding container 24 and a position 30 for placing the server 24 relative to the funnel 28. During a brewing cycle water is introduced into the funnel 28 for combination with and infusion of a brewing substance retained in the funnel 28 for producing a brewed beverage which is dispensed into the server 24 positioned underneath the funnel 24.

Figure 2:
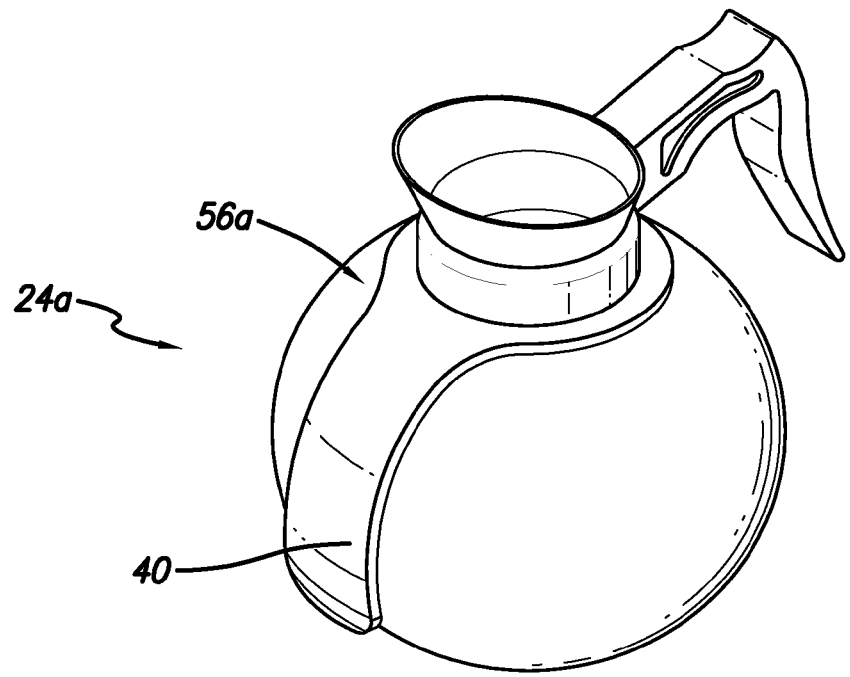
FIG. 2 is an illustration of a heatable server including an information device positioned on the heatable server.
Figure 3:
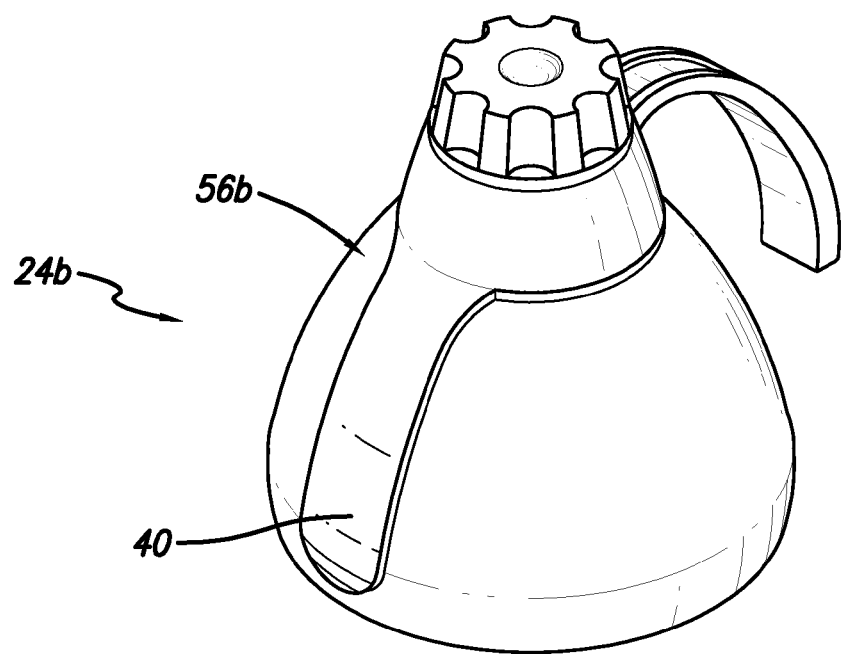
FIG. 3 is an illustration of a thermal server including an information device positioned on the thermal server.

The server location 30 can include a heater 62 which controllably maintains the heat of the beverage retained in the heatable server 24a (see FIG. 2) at a desired level. Additionally, the heater may be controllable to selectively apply heat or apply a certain level of heat. In the situation in which the server 24 is an unheated server such as a thermal carafe 24b (see FIG. 3), it would be desirable to not apply heat to the thermal server 24b. The reason for not applying heat to a thermal server 24b is, depending on the type of server, the application of heat may be detrimental to the structure and function of such a server and an unnecessary expenditure of heat energy and associated electricity. In this situation it would be desirable to be able to not heat the server 24*b* or otherwise turn off the power to prevent heating of the server.

It would be desirable to provide an information vehicle device 40 and a corresponding read/write information communication device 44 to sense or otherwise detect the presence, absence, or both of a server 24 proximate to the information communication device 44. The information vehicle device 40 will be referred to as the "information device 40" herein with the understanding that this is to be broadly interpreted and not limiting. The corresponding read/write information communication device 44 will be referred to as the "reader 44" herein with the understanding that this is to be broadly interpreted and not limiting. The information device 40 can be used to track, at least one of the characteristics of the beverage contained in the server 24 and the type of server. The ability to track the beverage would be useful in the situation in which the server 24 is removed from the first brewing device 26 and placed either at a second brewing device 50 or a warming station 54. Additionally, once the server 24 is moved to one of the other devices 50, 54 it may be moved between the devices and not returned to the original brewing apparatus 26.

While the reader 44 is shown as being in a position such as the server receiving location 30, the reader 44 may be placed otherwise on any of the corresponding apparatus to read the information device 40. Generally, it is envisioned that the information device 40 and reader 44 may require some degree of relative proximity to provide a signal. This is due to the current limitations relating to such information devices 40 such as RFIDs. However, it is envisioned and fully within the scope of the present disclosure that other information devices and associated readers may be employed or developed which do not require relatively close proximity of the server to the reader and which may not be an RFID device. It is envisioned that such systems and devices and all existing and hereafter developed systems and devices are fully included within the scope of the present disclosure and encompassed by the present disclosure.

In at least one embodiment, an information device 40 and reader 44 is provided which includes some relative proximity between the devices. Additionally, while a variety of information devices is anticipated including magnetic portions such as magnetic strips or dots, bar code readers, optically sensed components, conductive components, inductive components, an RFID device 40 and a corresponding RFID reader 44 is shown and described. The disclosure of the information device 40 as an RFID device and the reader 44 as a corresponding reader is provided by way of illustration and not limitation with all other variations of information devices and readers/writers fully encompassed within the scope of this disclosure. Bunn-O-Matic Corporation, assignee of the present application, has developed various applications of RFID technology for use with beverage apparatus, including U.S. Pat. No. 7,223,427, "Beverage Maker Interface", which is incorporated herein by reference in its entirety. Also, the information device 40 is shown as being attached to or otherwise dependent upon the server 24. It is envisioned that the information device may be permanently affixed to, bonded to, over molded, embedded in, integrally formed as a part of, temporarily affixed to, removably carried on, or otherwise associated with the server 24.

As shown in FIGS. 1, 2, 3 and 4, a collar 56, 56*a* (see FIG. 2), and 56*b* (see FIG. 3) is provided which allows the information device 40 to be generally securely retained to the server 24 and removable therefrom. The removability and secure retention of the information device 40 on the server 24 may be useful. In the event the server 24 becomes damaged or otherwise unusable, the information device 40 can be removed and attached to another server 24. A removably attachable information device 40 also may be useful in a situation in which components are retrofitted to existing beverage preparation systems. It may be useful to remove the information device 40 for cleaning of the server 24 and then reattaching the information device after cleaning the server. Additionally, removal of the information device 40 from the server may be useful for repurposing of servers which will no longer be used with the overall system. This will allow the device 40 to be removed and redeployed to the system while reusing the server. In this situation, it may be useful or desirable to allow the device 40 to be removable without tools so as to prevent damage to the device 40 and the server.

A variety of devices for retaining the information device 40 on the server and be devised. All versions of such devices are intended to be incorporated in the present application, without limitation and incorporated within the present disclosure. By way of example, the structure for retaining the information device 40 on the server 24 may be in the form of an elastic or otherwise retaining band which an be attached to the body of the server. Such a band may be in the form of an elastomeric band in which the chip has been molded in, bonded to or inserted in a pocket on the band. This allows the band to be quickly and easily recovered if the server body is broken. This provides another form of removable device 40 holder for use with the server. The band might be color coded in the coding system which is currently used for decaf and regular coffee, namely, orange and brown. This would provide another level of identification of characteristics of the beverage.

Figure 5:
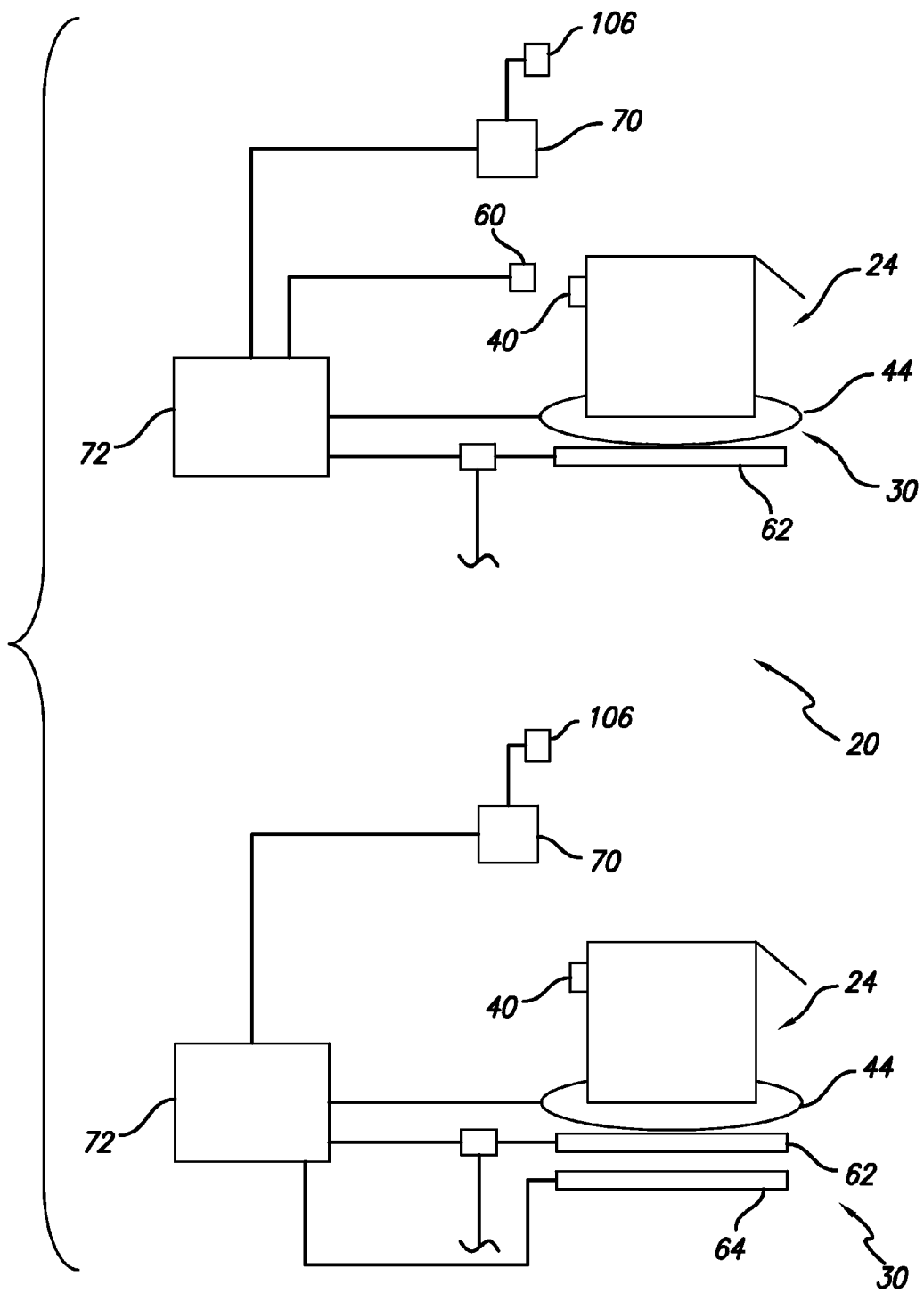
FIG. 5 is a diagrammatic illustration showing the general relationship between the server, information device, reader, controller, and additional devices such as an information transfer component, a heater or other sensors.

During a brewing cycle, information can be transferred to the information device 40 from a read/write transfer device 44. Alternatively, a separate transfer device 60 (see FIG. 5) could be provided. Once the information is transferred to the information device 40 the information will travel with the server 24 regardless of where it is placed. The reader 44 can be provided at each location at which the server may be placed. This includes both active and passive locations. An active location may include heaters 62 (see FIG. 5) or other devices 64 which may affect or detect the condition or characteristics of beverage in the server 24. When placed at the alternate locations 50, 54 or even the original brewer 26 information about the beverage in the server 24 can be read from the information device 40 by means of the reader 44. With reference to FIG. 4, the information can be displayed on a display 70 coupled to a controller 72 associated with the corresponding apparatus 26, 50, 54. The information displayed on the display 70 can be in any of various forms which are sensed by a user. For example while a visual display of information relating to the beverage is shown and described, it is also fully within the scope of the present disclosure to include any form of sensory feedback. Such sensory feedback may include audible signals such as acoustic or other alarms or alerts, lighted signals, vibrational signals, aroma signals as well as any other form of communication to a user which can be used to communicate information to the user such as characteristics of the beverage.

In an embodiment in which a visual display is used, the display 70 may be used to display text or symbolic information relating to the characteristics of the beverage. In this regard, information such as the remaining life of the beverage, current freshness of the beverage, or any other information can be displayed. The level of the beverage could be displayed as such information may be useful when the container holding the beverage is not suitably transparent. For example in the situation in which a thermal server is used, the material may be a metal housing including a vacuum jacket. In this configuration, the other devices 64 may include a weight detector 64 or other volume detector used to communicate information to the controller 72.

The weight detector of the other devices 64 can be calibrated with a tare weight equal to the weight of a thermal server unit. When the weight sensors of the other devices 64 detect a weight, it can automatically tare the weight of the thermal server to provide a resultant weight. The resultant weight can be correlated to a corresponding weight per volume of coffee in such a server to provide a representation of the volume of coffee in the server on the display 70. Additionally, the tare weight of the thermal server can be carried on the information device so that if a variety of thermal servers are used an accurate tare weight can be associated with each server. This tare weight can then be used by the controller to calculate a more accurate level condition report.

While a heatable and thermal server 24 have been shown and illustrated throughout the drawings, it is also envisioned that a variety of servers could be used with the present system. In this regard, servers which are used by a person to pour coffee or other beverages have been shown in the illustrations for purposed of illustration and not limitation. It should be understood that the servers compensated by the present disclosure also include any form of server which might be used for a beverage. Such servers might include a larger volume generally stationary server which include a controllable faucet for dispensing beverage there from. Such servers are found in settings in which the server does not need to be moved or carried to the customer. In contrast, such a server it may be sufficient to place a server at one location for dispensing of beverage by control of the faucet to a cup or container placed there under. Such a server might be a self server dispenser such as might be found in many fast food restaurants. This type of server is described to further illustrate and encompass a variety of servers to be used with the present apparatus, system, and method. It should be understood that regardless of the type of server or, beverage container, that the systems, apparatus and methods as disclosed herein apply.

For example, if a server such as a SoftHeat® server (trademark of Bunn-O-Matic Corporation, assignee of the present application) is incorporated in the present system all of the associated features may apply. Bunn-O-Matic Corporation, assignee of the present application, has developed various applications of controllable servers which it identifies as Soft-Heat® technology, including U.S. Pat. Nos. 6,070,771; 6,089,409; and 6,139,888 and any related continuation, continuation-in-part and divisional applications which are incorporated herein by reference in the entirety. In this regard, the information device can be attached, or otherwise associated with the server. This allows the server to be placed at a brewer for filling with beverage from the brewer. The brewer can include a write device to write information to the information device. When the server is then moved away from the brewer and placed at a SoftHeat® satellite station. The SoftHeat® server is then placed at a satellite station including a least a read device. The read device can then determine the relevant information as described hereinabove. The SoftHeat® station can then control the heating of the beverage in the server or cessation of the heat to the server in relation to the information provided on the information device.

The present apparatus and system provide pervasive sensing of the information device on the server 24 so that no matter the location of the server 24, information about its contents can be provided. This may be useful in a situation in which coffee or other beverages are prepared in a kitchen and then moved to a more publicly accessible location. Such a situation may arise in a fast food service setting in which the operator wishes to control the preparation of the beverage but then provides the server for use by the customers. Similarly, in a white tablecloth restaurant beverages may be prepared in the kitchen but then presented to the wait staff in a more publicly accessible location so the wait staff does not need to travel between the kitchen and the dining area to refill beverages. The present system, apparatus and method of use will help facilitate providing information about the status of the beverage to provide a better beverage experience.

In use, the server is placed for received information from at least a writing device or transfer device 60 so that the information device 40 carried on the server can receive information. The server receives beverage and the information carried on the information device 40 is relevant to the beverage. The information may be detailed information about the beverage specifically the type the characteristics as well as a time stamp for other information related to freshness characteristics of the beverage. In this regard, information carried on the information device will be read by the reader 44 and used by the corresponding controller 72 for use in control of the warmers 62, other devices 64 and/or display 70.

The server 24 may either remain at the location 30 or may be moved to an alternate location which includes all or some of the features as described above. For example, an alternate location may only include a reader 44 and a control 72. This allows the location to read the information device 40 and provide information to the controller 72. This may be used with either display 70 or a heater 62 or other device 64. Any one or all of these devices may be provided at the second location. For example, if the length of time which the server is intended to sit at a heater 62 is not relevant to the overall equation, the location might include only the other device such as a weight system 64 and a display 70 to provide a level of the beverage retained in the server. In this situation, the controller 72 might not display information on the display 70 if the server 24 is identified by the information device as being a heatable or transparent server. Alternatively, if the server is a thermal server the information device, if it carries this information, might then provide information to activate the display 70 to identify the level of condition the server.

Similarly, and importantly, the location may include the heater assembly 44. The server 24 carrying information about the characteristics of this server construction can then provide information to the controller 72 to activate or deactivate the warmer in response to the type of server. In this regard, if the server is a heatable glass server or other material server the warmer can be activated. Pre-programmed routines can be provided by the controller to control continuous or non-continuous heating patterns to provide desired heating results. Bunn-O-Matic Corporation, assignee of the present application, has developed various applications of controllable heating systems including U.S. patent application Ser. No. 10/521,613, "Temperature Control System" which is incorporated herein by reference in its entirety. Additionally, the controller 72 can control the warmer assembly 62 to deactivate when a predetermined time period have been reached to prevent over heating of the coffee in the server. If the server is a thermal server placement of the thermal server on a heating device will either maintain the heating device in a de-activated condition or turn off the heating device to prevent unnecessary heating of the thermal server. Deactivating of the heater or preventing activation of the heater in the presence of a thermal server not only prevents potential undesirable heating of the server; it also can be used to reduce energy costs by preventing unnecessary heating. The information device attached to the respective servers 24a, 24b may include a locked information storage area or memory section to prevent changing the identification of the type of server. Alternatively, if the information device is carried on a removable and reusable attachment structure, this area can be provided in an unlocked condition so that relevant information relating to the type of server can be written to the information device on demand.

As an additional matter, the system can be programmed or otherwise adapted to differentiate the type of server material. This arises from the effect of the serving material on the information device. In this regard, an information device carried on a metal, thermal server might produce a different signal than a similar device or the same device carried on a glass server. In this regard, the metal detunes the signal from the information device. Identifying this detuned condition can be used to differentiate the devices. This can be used as a confirmation for information devices which include identification of the server or may be used as a primary source of identifying the type of server. This information can be used to control the relevant actions associated with the system or may be used as a confirmation to produce a signal to the user if the information carried on the chip in not consistent with the signal, detuned or tuned associated with the server material carrying the information device.

Figure 6:
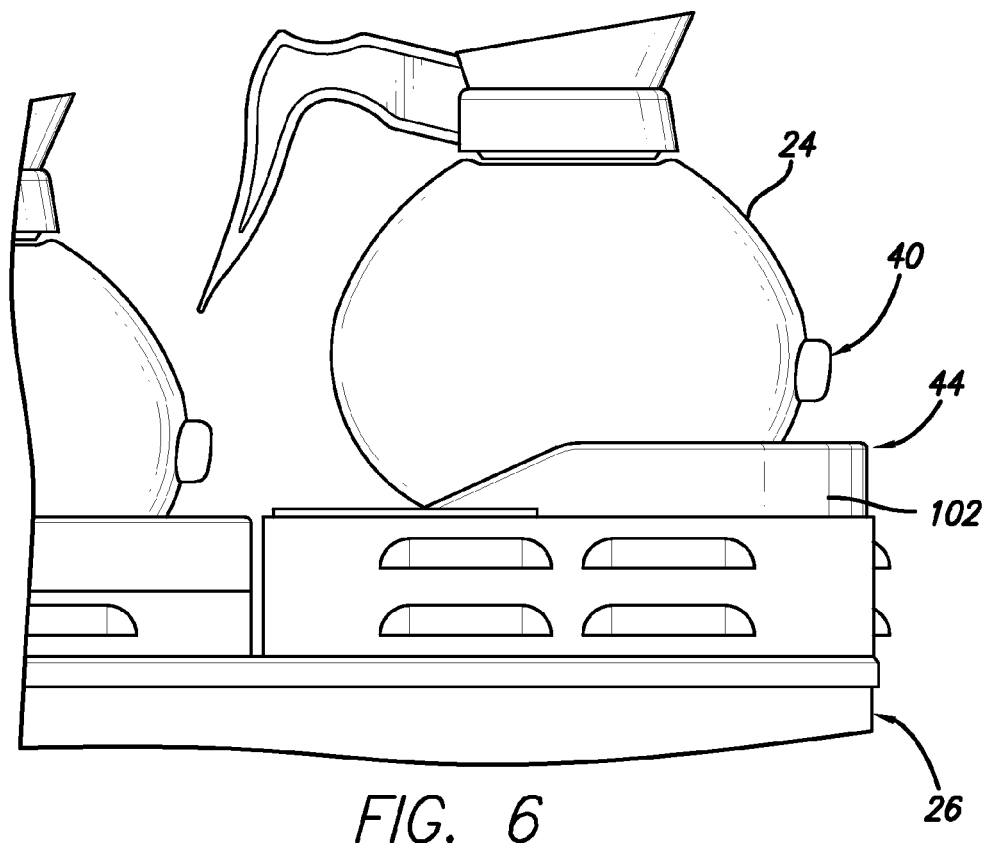
FIG. 6 is an enlarged side elevational view showing a server positioned on a device including a reader in the form of a collar positioned relative to a portion of the server. An information device carried on the server relative to the collar.
Figure 7:
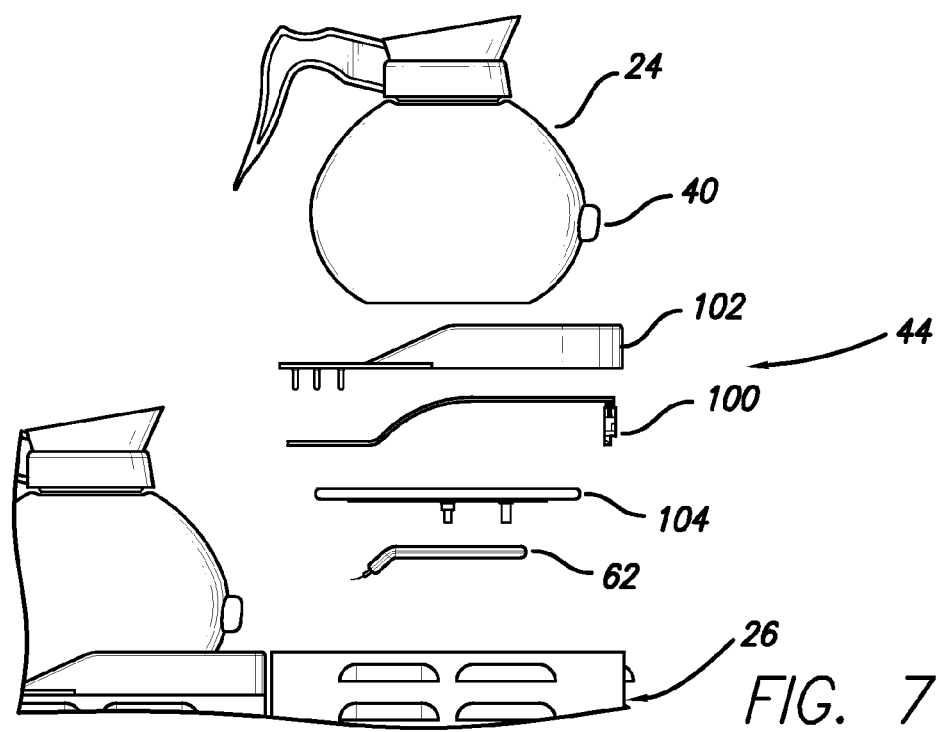
FIG. 7 is an exploded view of the partial fragmentary drawings shown in FIG. 6 showing the server and information device positioned above a corresponding housing for covering a coil portion of the reader assembly and also including a warmer associated with the housing and coil portion, the warmer includes a plate and a heating element.

With reference FIGS. 6 and 7, the server 24 is shown in a side elevational view including the information device 40 in association with a reader assembly 44. As shown, the reader assembly 44 includes a coil portion which is carried in a housing 102. Associated with the housing and coiled portion, depending on the application, may be a warmer plate 104 and a heating element 62 associated with the plate 104. The plate and heating element 62 may comprise the warmer 62. As shown in the exploded drawing of FIG. 7 the housing 102 includes a raised area which helps to elevate a portion of the coil 100 in proximity to the information device 40. By positioning the coil portion 100 in close proximity to the information device 40 a more accurate signal association can be sensed. The coil may either be a continuous coil placed around the perimeter of the based of the server 24 or may be a coil which is only wrapped in proximity to the location of the information 40 on the server. In this alternate embodiment, the coil might be wrapped in a continuous path and positioned along one portion of the perimeter of the server to avoid having a continuous coil around the perimeter of the server. In other words, the coil is curved along one side of the server and does not extend around the entire perimeter of the base of the server.

Figures 1, 8:
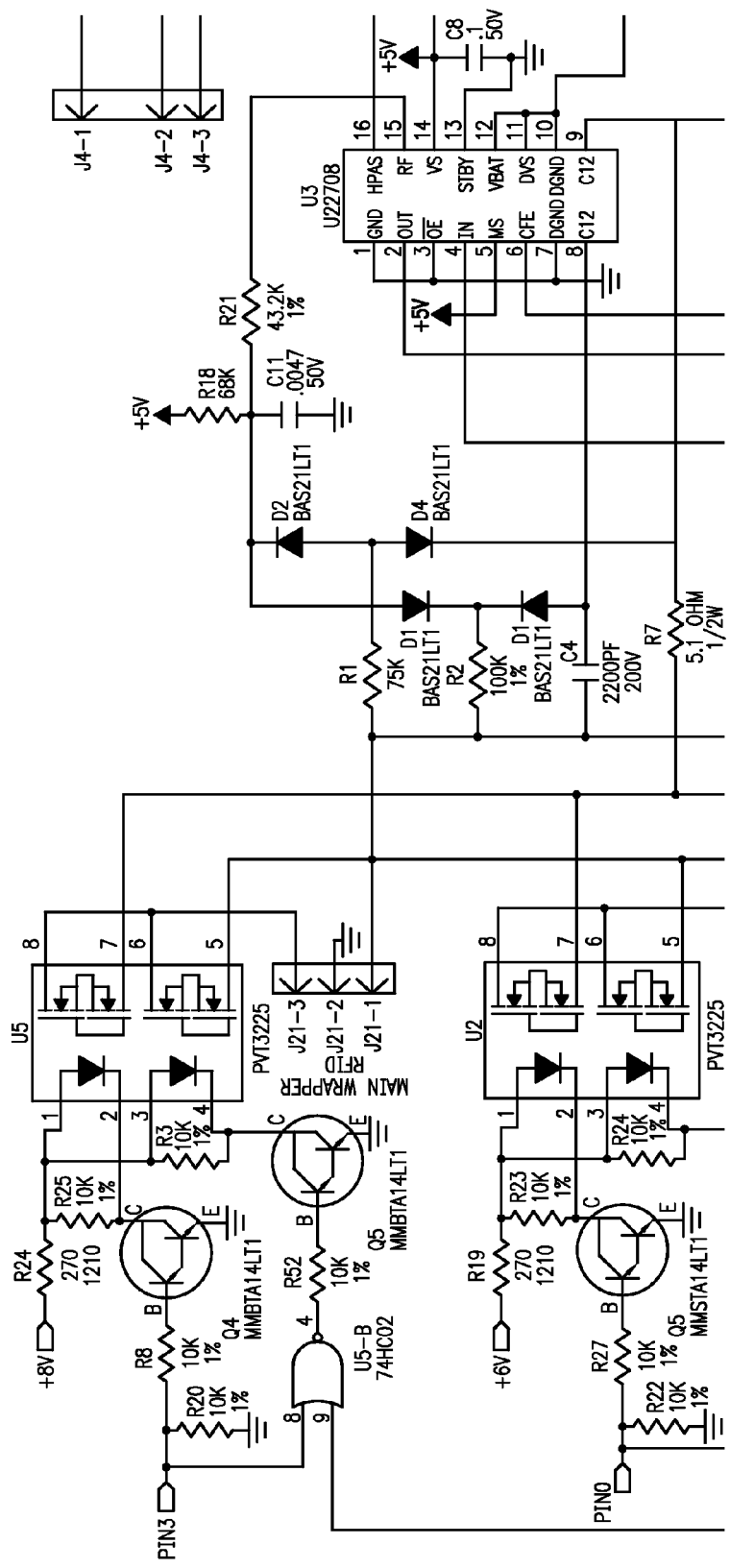
Figure 8:
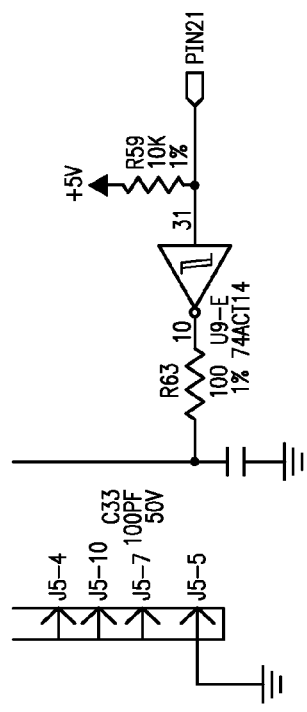
Figure 4:
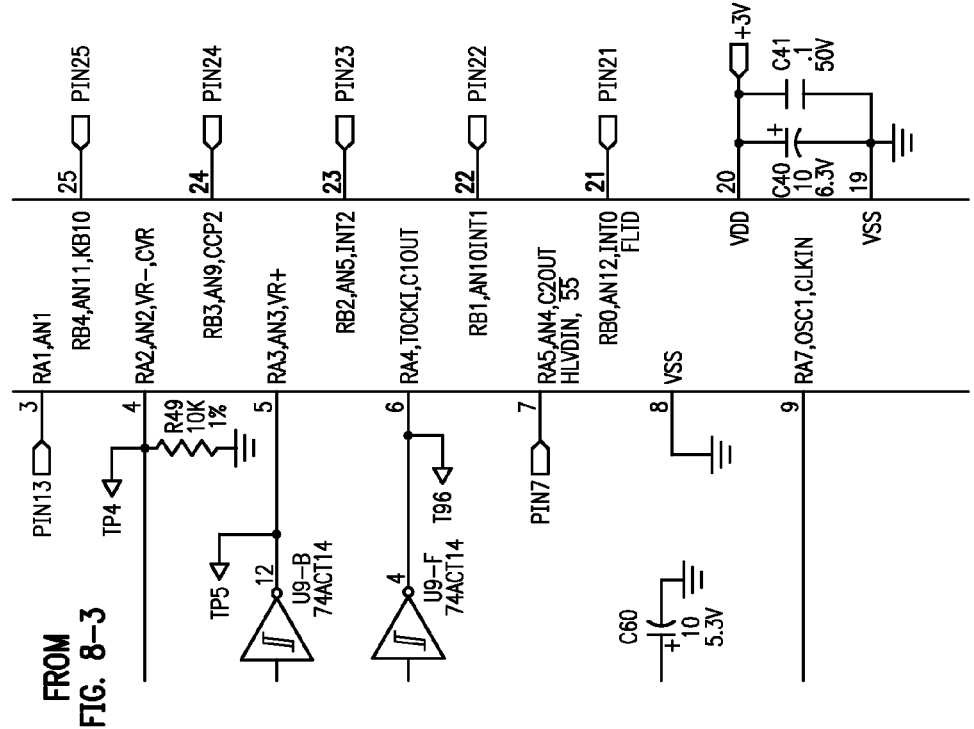
Figures 5, 8:
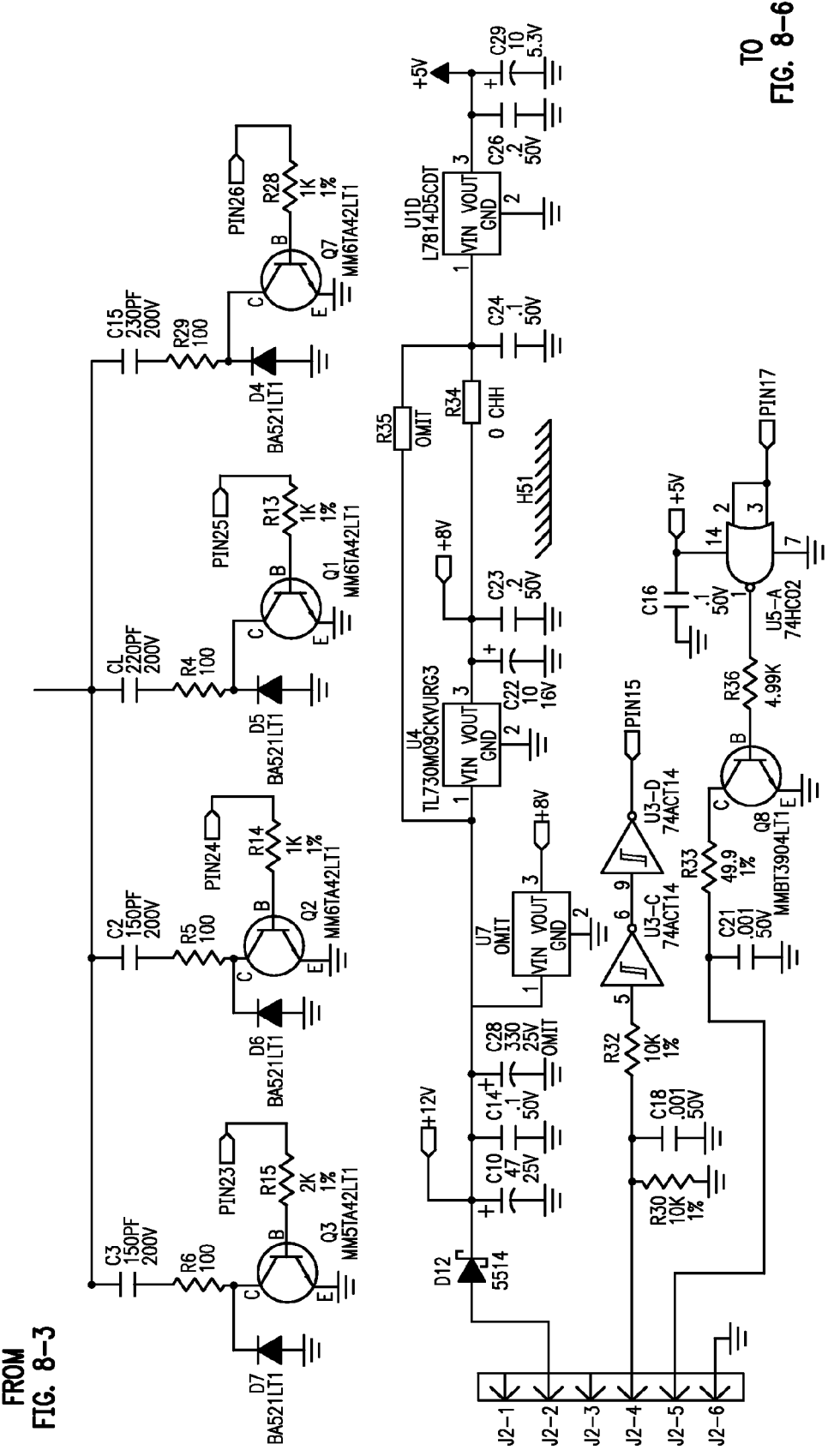
Figures 6, 8:
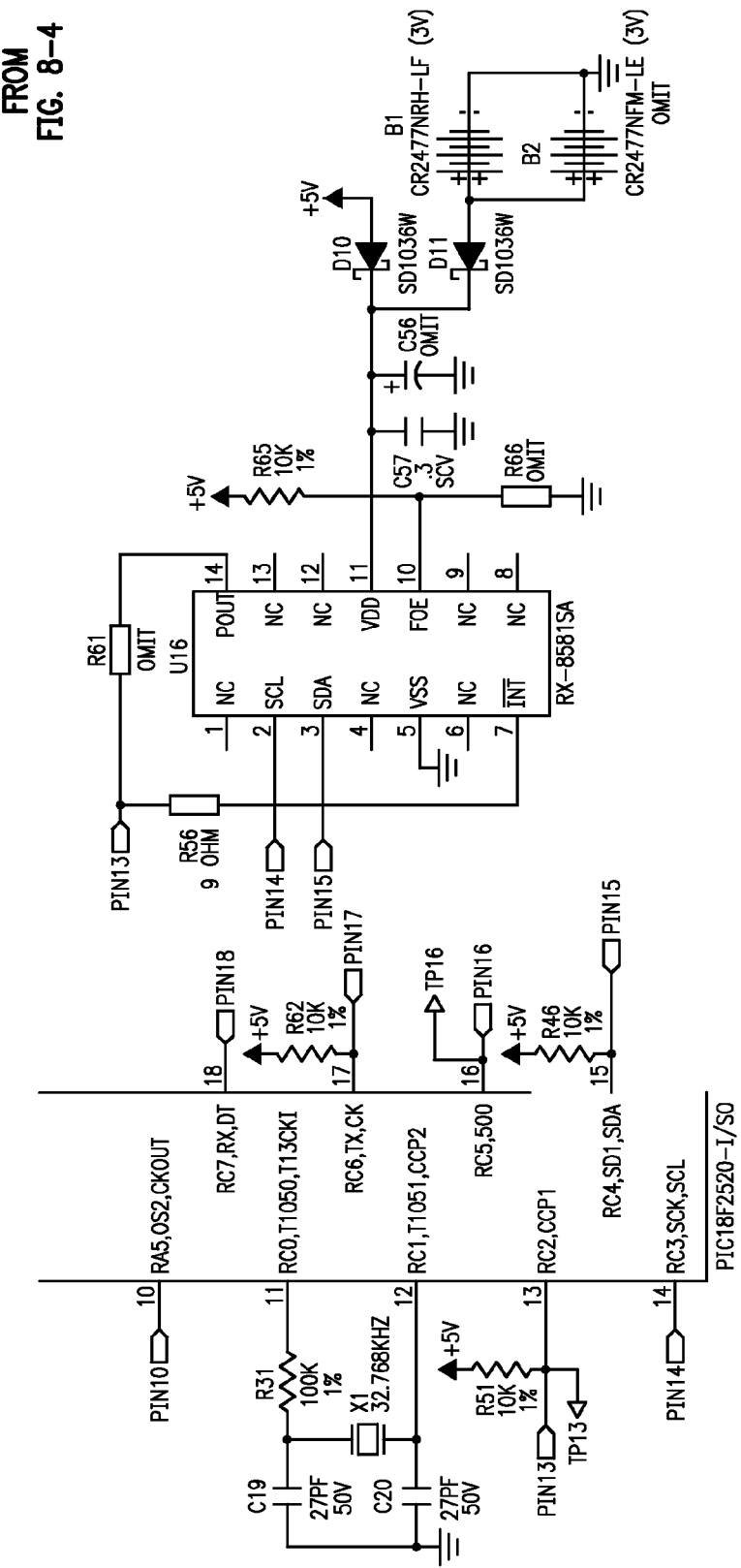
Figure 9:
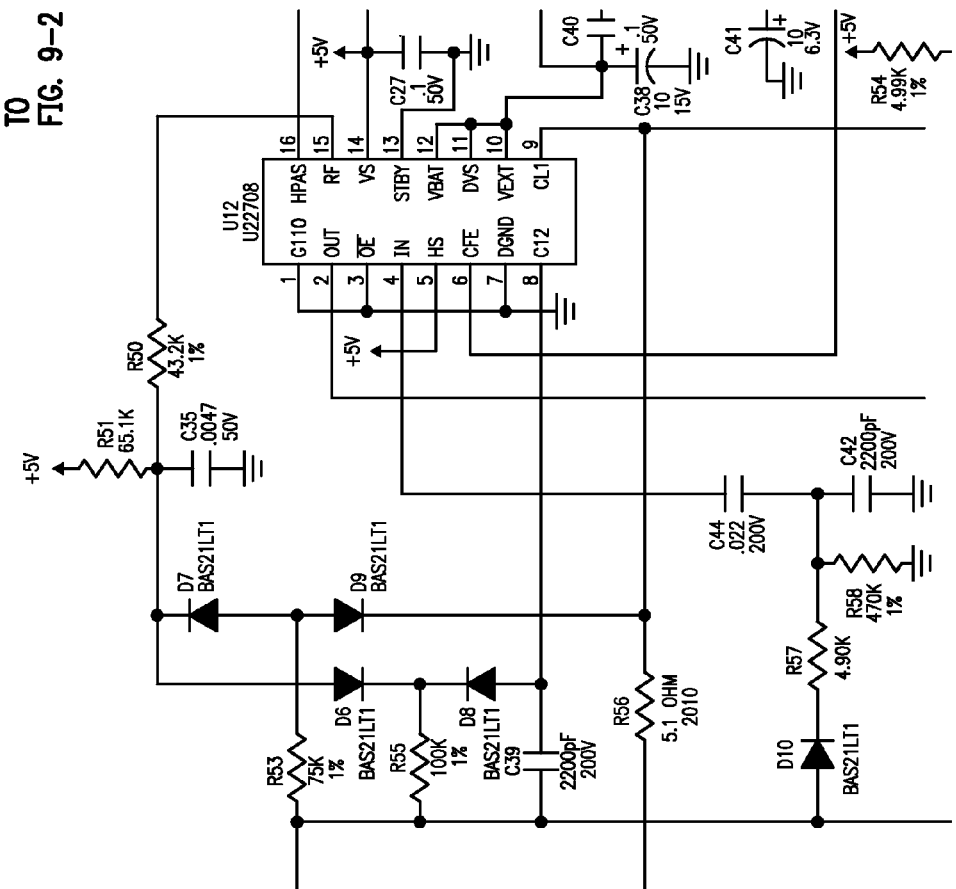
Figure 1:
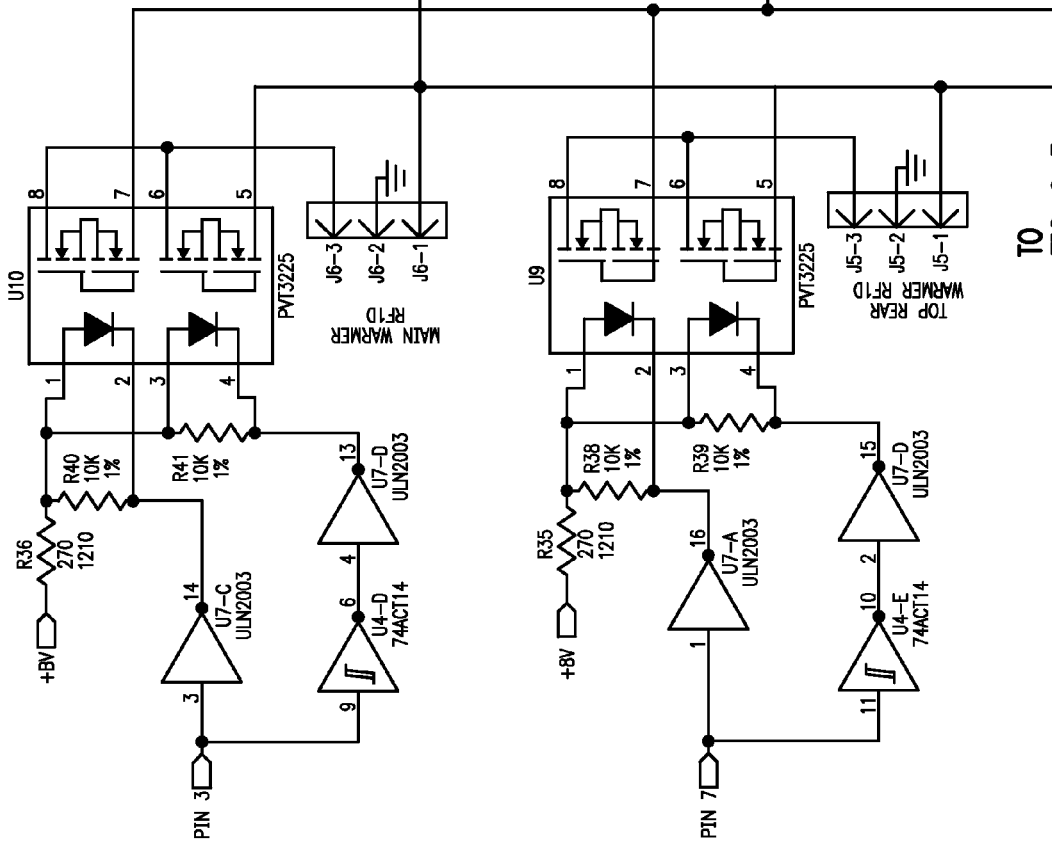
Figures 4, 9:
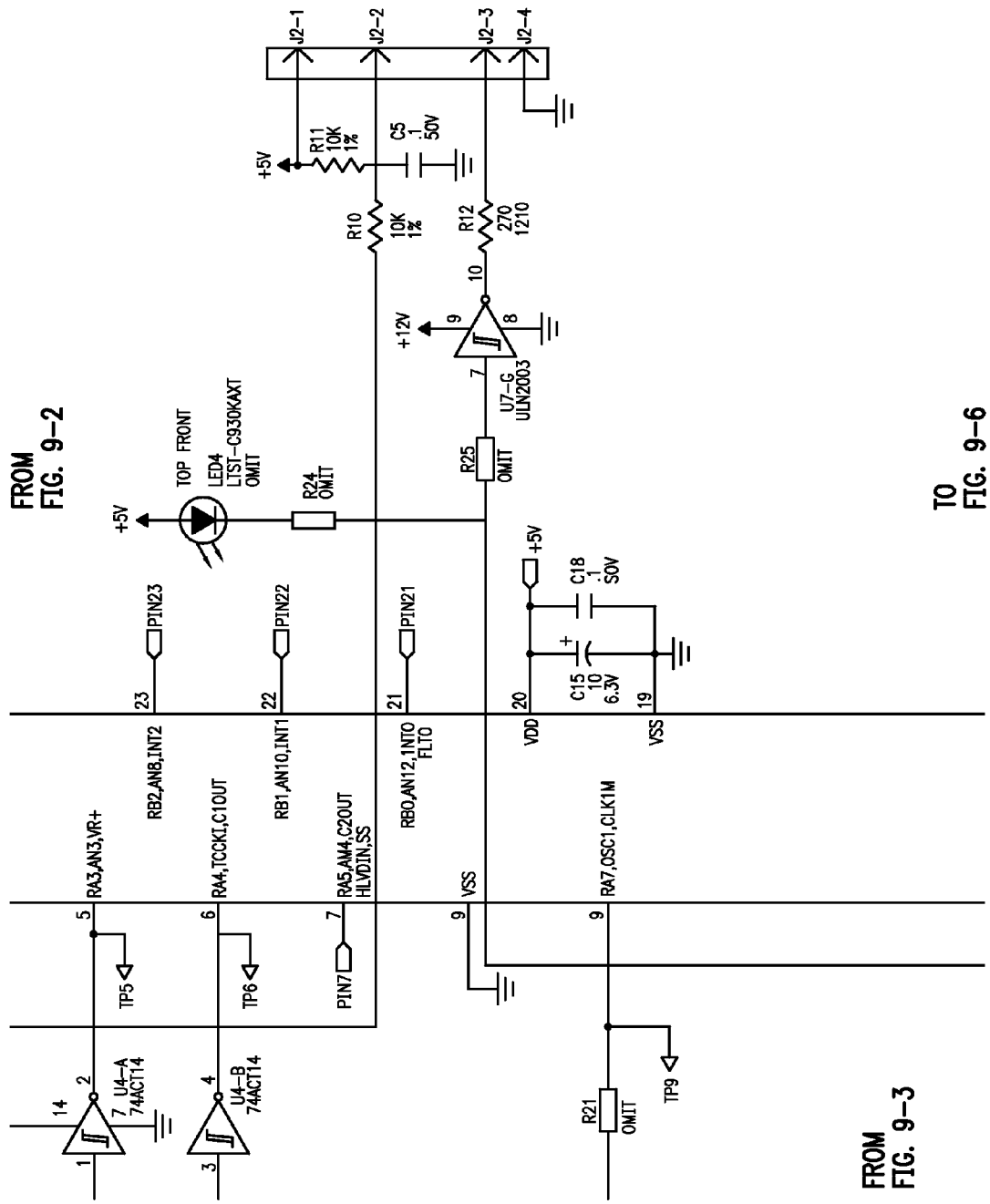
Figures 5, 9:
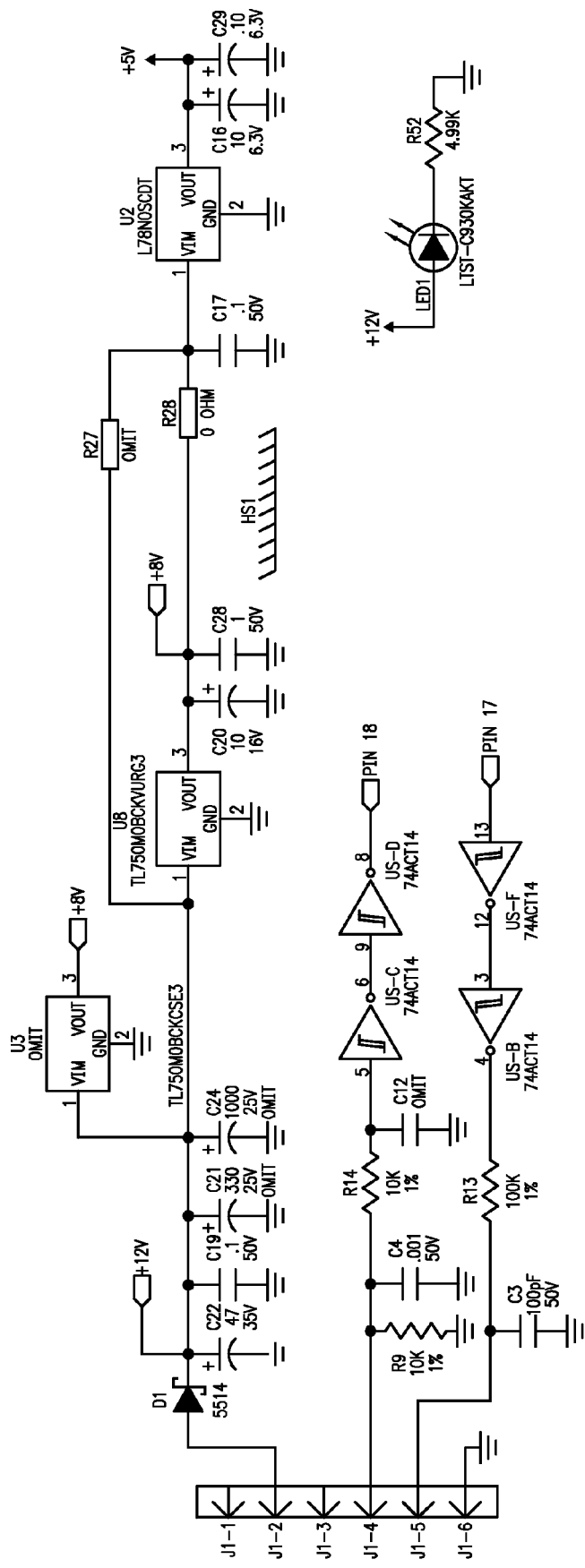
Figures 1, 10:
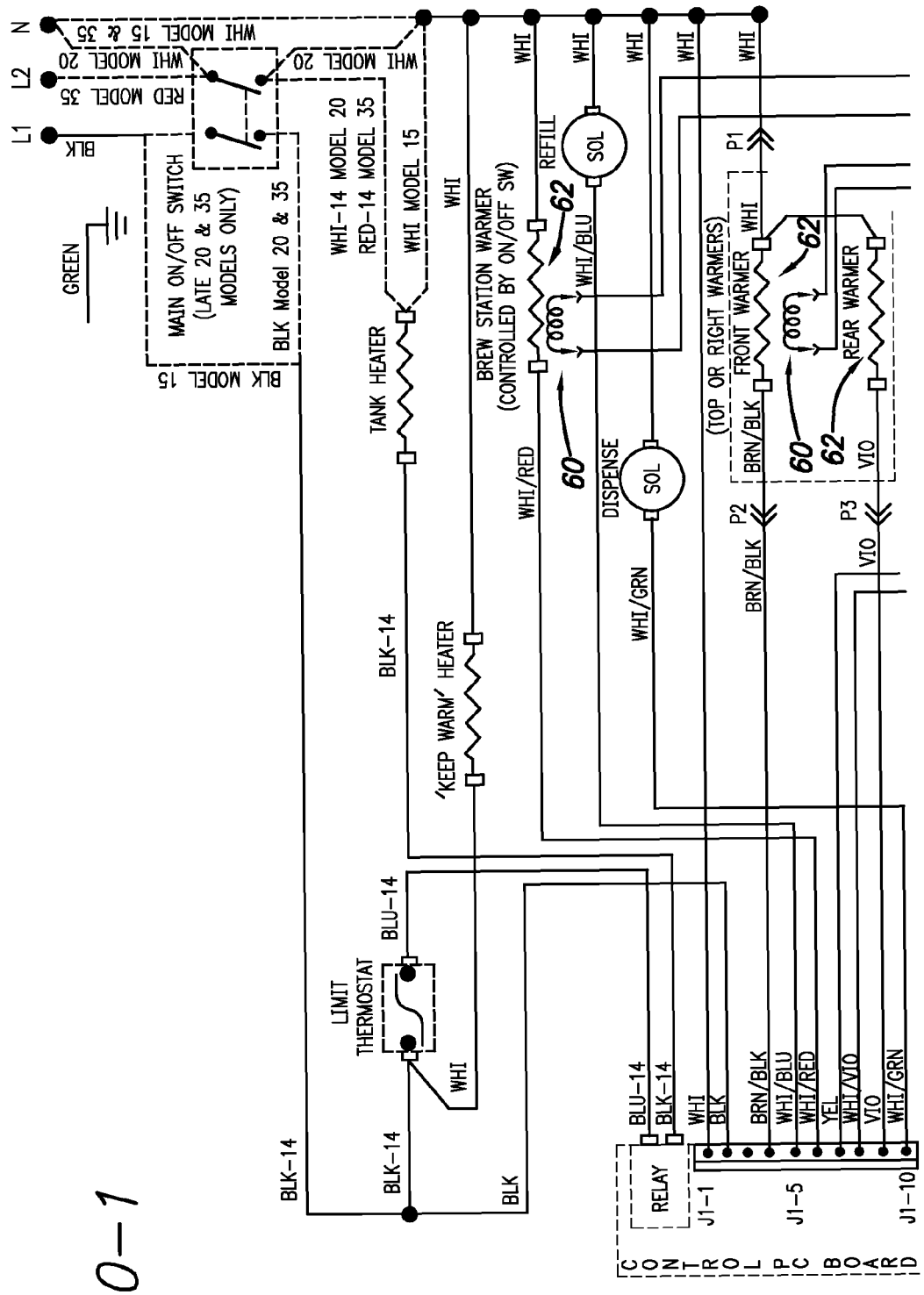
Figures 2, 10:
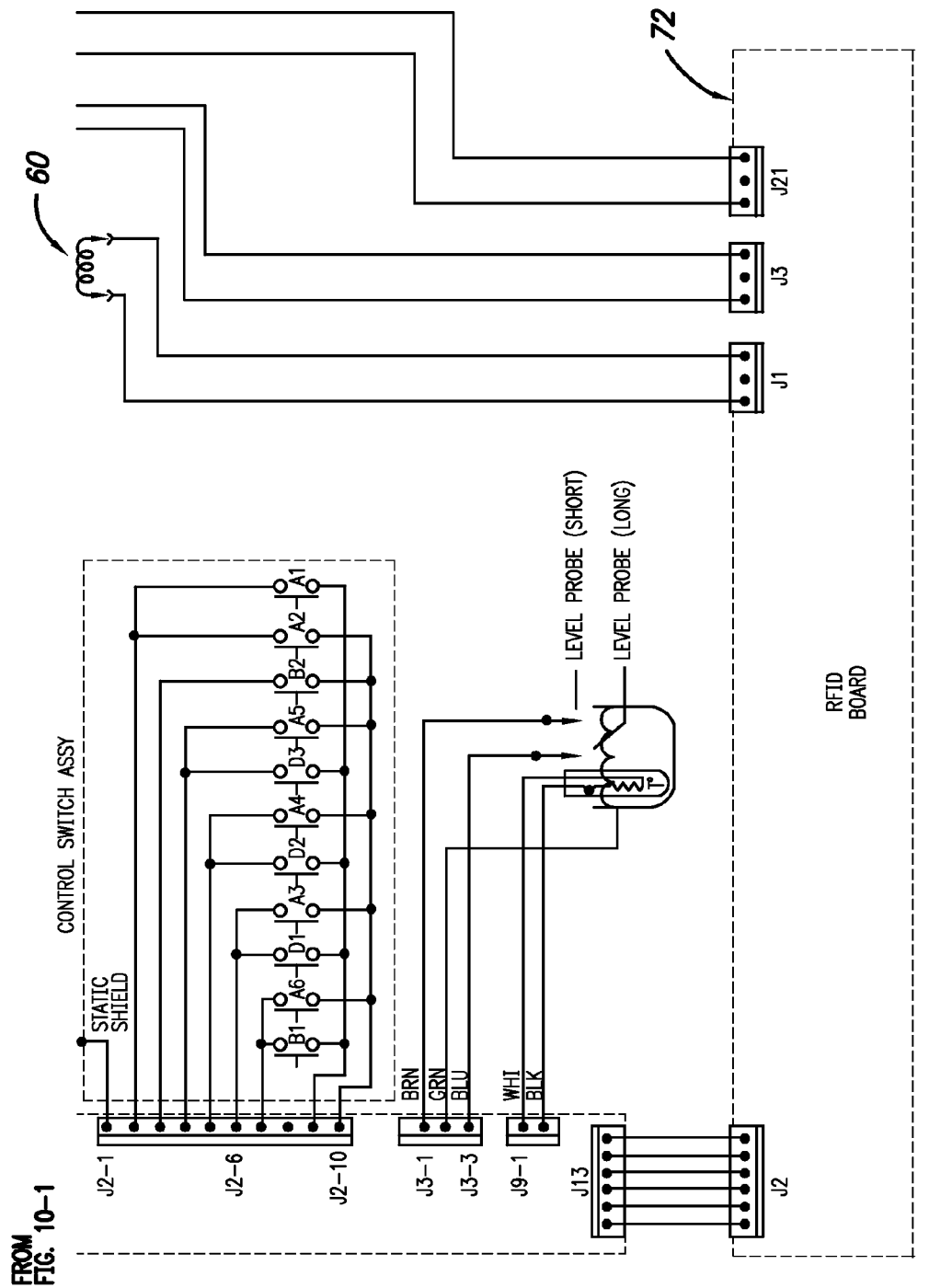

The schematics as illustrated in FIGS. 8, 9, and 10 provide additional support for the details of the operation relating to the system, method and apparatus.

The system, method and apparatus of the present disclosure allows for identification and tracking of server and control of characteristics associated with the servers to provide desired information and control. This allows the system to monitor freshness of beverage dispense into a server and identify when the beverage is no long within the freshness criteria. Additionally, this allows the system to control the heating of the beverage retained in the server. While the system is referred to in the present application does not necessarily mean that the apparatus or locations associated with the system are interconnected. To the contrary, this system allows the locations to be uncoupled. While connections, either physical or wireless can be made between the various locations of the system, such connections are not necessary as the information associated with the server travel with the server on the associated information device 40.

Additionally, energy savings can be realized by providing control of the associated warmers to prevent unnecessary use of energy. In this regard, the warmers are turned off when the beverage is outside of the freshness criteria. The warmers can also be turned off when the server is removed from the warmer so that energy is not expended on a warmer which is not providing any benefit by way of transferring energy to a beverage. The system can control the warmers to time out the warmers at a predetermined period of time everyday so as to allow any beverage remaining on the system, regardless of whether it is fresh, to cost towards the end of the business. This prevents leaving warmers on and dissipating heat unnecessary at the end of the day. As described and shown, control of energy associate with the system can be optimized to only apply energy to the system when necessary.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

The invention claimed is:

1. A beverage apparatus for identifying at least one characteristic of beverages associated with the apparatus to facilitate control, the beverage apparatus including:
   an information device for attachment to a beverage container;
   a reader associated with the beverage apparatus, the reader being positioned proximate to a location at which a beverage container will be placed during the use of the beverage apparatus to provide a relative proximity to the information device;
   a controller coupled to the reader and to the beverage apparatus, the controller receiving information from the reader as to the at least one characteristic associated with the beverage contained in the beverage container and the type of the beverage container; and
   the controller being coupled to the beverage apparatus such that operation of the beverage apparatus to dispense beverage from the apparatus into the beverage container is detected by the controller and is used to establish information and the at least one characteristic about the beverage dispensed into the beverage container, the information device carried on the beverage container providing information about the type of the beverage container and, independent of the type of beverage container, providing information about the beverage contained in the beverage container to provide tracking of the at least one characteristic associated with the beverage in the beverage container.

2. The apparatus of claim 1 in which the information device is attached to the beverage container in a permanent condition.

3. The apparatus of claim 1 further comprising the information device being removably attached to the beverage container.

4. The apparatus of claim 3 whereas the information device is carried in a collar which is mechanically removably attachable to the beverage container.

5. The apparatus of claim 3 wherein the information device is removably attachable to the beverage container without the use of tools.

6. The apparatus of claim 1 wherein the beverage apparatus includes a controllable warming device for providing energy to the beverage container to maintain beverage retained in the beverage container in a controllably heated condition.

7. The apparatus of claim 6 further comprising the controller coupled to the warming device for controllably activating or deactivating the warming device in response to the at least one characteristic detected by the controller associated with the beverage in the beverage container as indicated by the information device.

8. The apparatus of claim 7 wherein the controller deactivates the warming device upon the occurrence of a condition associated with the at least one characteristic of the beverage retained in the beverage container to terminate addition of energy to the beverage retained in the beverage container.

9. The apparatus of claim 1 further comprising an information display associated with the beverage apparatus and coupled to the controller for displaying in a form detectable by a user information associated with the at least one characteristic of the beverage retained in the beverage container.

10. A beverage apparatus for identifying at least one characteristic of beverages associated with the apparatus to facilitate control, the beverage apparatus including:
   an information device for attachment to a beverage container;
   a reader associated with the beverage apparatus, the reader being positioned proximate to a location at which a beverage container will be placed during the use of the beverage apparatus to provide a relative proximity to the information device, the reader including means for writing information to the information device to facilitate tracking of the at least one characteristic associated with beverage dispensed from the beverage apparatus to the beverage container;
   a controller coupled to the reader and to the beverage apparatus, the controller receiving information from the reader as to the at least one characteristic associated with the beverage contained in the beverage container and the type of the beverage container; and
   the controller being coupled to the beverage apparatus such that operation of the beverage apparatus to dispense beverage from the apparatus into the beverage container is detected by the controller and is used to establish information and at least one characteristic about the beverage dispensed into the beverage container, the information device carried on the beverage container providing information about the type of the beverage container and information being associated with the beverage contained in the beverage container to provide tracking of the at least one characteristic associated with the beverage in the beverage container.

11. The apparatus of claim 10 further comprising the information device being removably attached to the beverage container.

12. The apparatus of claim 10, further comprising the controller coupled to a warming device for controllably activating or deactivating the warming device in response to the at least one characteristic detected by the controller associated with the beverage in the beverage container as indicated by the information device.

13. A method for monitoring at least one characteristic of a beverage retained in a beverage container, which beverage container is associated with a beverage apparatus including at least one of a beverage dispensing device and a beverage container station, the method comprising the steps of:
   providing a device for at least one of reading and writing information carried on an information device;
   providing a controller coupled to the at least one of the beverage dispensing device and the container station for receiving information as to the characteristics associated with the beverage contained in the beverage container and the type of the beverage container associated with the information device;
   positioning the beverage container relative to a beverage dispensing device for receiving beverage from the beverage dispensing device;
   activating the beverage dispensing device to initiate the dispensing of the beverage therefrom;
   initiating information associated with the dispensing of beverage to the beverage container;
   associating the information relating to dispensing of beverage to the beverage container to the information device associated with the beverage container;
   monitoring information associated with the information device associated with the beverage container at least when the beverage container is displaced from the beverage dispensing apparatus and positioned relative to a second device; and
   updating information associated with the at least one characteristics of the beverage retained in the beverage container based on the information associated with the information device.

14. The method of claim 13 further comprising the steps of:
   providing a controllable warming device for providing energy to a beverage container to maintain beverage retained in the beverage container in a controllably heated condition, the warming device being coupled to the controller to controllably operate the warming device; and
   controllably activating and deactivating the warming device in response to the at least one characteristic of the beverage retained in the beverage container using the controller to control the warming device.

15. The method as in claim 14 further comprising the steps of:
   providing information on the information device about the type of beverage container in which beverage is dispensed, the type of beverage container including at least one of a heatable beverage container and a non-heatable beverage container;
   detecting the type of beverage container upon placing the beverage container relative to the device; and
   controllably operating the warming device in response to the type of beverage container detected.

16. The method as set forth in claim 15 further comprising the steps of:
   providing a display device associated with at least the beverage apparatus for displaying in a form which can be sensed by a user, at least one characteristic of the beverage retained in the beverage container based on information associated with the information device.

17. The method of claim 13 further comprising the steps of monitoring the at least one characteristic of the beverage as the beverage container is moved between various positions for detecting the status of the at least one characteristic; and
   writing updated information to the information device after monitoring at a new location to track the condition of the beverage retained in a beverage container.

18. The method as set forth in claim 13 further comprising:
   providing a weight detector for detecting the weight of the beverage container and beverage retained in the beverage container;
   calibrating the weight detector with a tare weight equal to the weight of the beverage container at the initiation of dispensing beverage into the beverage container to detect the weight of the beverage container without beverage;

detecting the difference between the tare weight and the detected weight of the beverage container and beverage when monitoring the at least one characteristic of the beverage; and correlating the resultant weight to a corresponding weight per volume of the beverage in the beverage container.

\* \* \* \* \*